(12) United States Patent
Kamada et al.

(10) Patent No.: US 7,874,225 B2
(45) Date of Patent: Jan. 25, 2011

(54) CONTROL APPARATUS AND METHOD FOR SHIFT-POSITION CHANGING MECHANISM

(75) Inventors: Atsushi Kamada, Aichi-ken (JP); Masahiro Taniguchi, Aichi-ken (JP)

(73) Assignees: Toyota Jidosha Kabushiki Kaisha, Toyota (JP); Kabushiki Kaisha Tokai-Rika-Denki-Seisakusho, Niwa-gun (JP)

( * ) Notice: Subject to any disclaimer, the term of this patent is extended or adjusted under 35 U.S.C. 154(b) by 539 days.

(21) Appl. No.: 11/976,290

(22) Filed: Oct. 23, 2007

(65) Prior Publication Data

US 2008/0108480 A1    May 8, 2008

(30) Foreign Application Priority Data

Nov. 2, 2006 (JP) .............................. 2006-299365

(51) Int. Cl.
*F16H 59/02* (2006.01)
(52) U.S. Cl. ...................................................... 74/335
(58) Field of Classification Search ............... 74/473.12
See application file for complete search history.

(56) References Cited

U.S. PATENT DOCUMENTS

| 6,271,663 | B1 * | 8/2001 | Kanbe et al. ............ 324/207.21 |
| 2007/0017310 | A1 * | 1/2007 | Matsuzaki et al. ............. 74/335 |

FOREIGN PATENT DOCUMENTS

| DE | 102 27 633 A1 | 1/2004 |
| EP | 1 750 039 A1 | 2/2007 |
| JP | A-07-012216 | 1/1995 |
| JP | A-10-024749 | 1/1998 |
| JP | A-2004-353828 | 12/2004 |
| JP | A-2005-337376 | 12/2005 |
| JP | A-2006-044565 | 2/2006 |

OTHER PUBLICATIONS

Office Action issued in German Application No. 10 2007 051 538.5 on Jul. 30, 2010 (with English translation).

* cited by examiner

*Primary Examiner*—Sherry L Estremsky
*Assistant Examiner*—Edwin A. Young
(74) *Attorney, Agent, or Firm*—Oliff & Berridge

(57) ABSTRACT

A control apparatus for a shift-position changing mechanism includes a detection unit that is provided on a path along which the operation member with a magnetic member moves, and that detects a change in the magnetic field due to a positional change of the operation member; and a determination unit that determines the shift position corresponding to the operated position of the operation member based on the detected change in the magnetic field and predetermined multiple modes of changes in the magnetic field, which correspond to the respective shift positions. The predetermined modes are set such that, when the detected change in the magnetic field is influenced by a change in the magnetic field due to a factor different from the positional change of the operation member, a likelihood that the determination unit determines that the running shift position, at which a vehicle is able to run, is selected is reduced.

20 Claims, 12 Drawing Sheets

FIG. 5

DETERMINATION OF SELECTED SHIFT POSITION FROM AMONG FOUR SHIFT POSITIONS (1)

|  | R | N | REFERENCE POSITION | D |
|---|---|---|---|---|
| FIRST SIGNAL | 1 | 1 | 0 | 0 |
| SECOND SIGNAL | 0 | 0 | 1 | 0 |
| THIRD SIGNAL | 0 | 1 | 0 | 1 |

FIG. 6

| | First Signal | Second Signal | Third Signal | |
|---|---|---|---|---|
| | 0 | 0 | 0 | Y1 |
| | 0 | 0 | 1 | Y2 |
| | 0 | 1 | 0 | Y3 |
| | 1 | 0 | 0 | Y4 |
| | 0 | 1 | 1 | Y5 |
| | 1 | 0 | 1 | Y6 |
| | 1 | 1 | 0 | Y7 |
| | 1 | 1 | 1 | Y8 |

| First Signal | Second Signal | Third Signal | X1 | X2 | X3 | X4 | X5 | X6 | X7 | X8 |
|---|---|---|---|---|---|---|---|---|---|---|
| | | | 0 | 0 | 0 | 1 | 0 | 1 | 1 | 1 |
| | | | 0 | 0 | 1 | 0 | 1 | 0 | 1 | 1 |
| | | | 0 | 1 | 0 | 0 | 1 | 1 | 0 | 1 |
| | | | 0 | 1 | 1 | 1 | 2 | 2 | 2 | 3 |
| | | | 1 | 0 | 2 | 2 | 1 | 1 | 3 | 2 |
| | | | 1 | 2 | 0 | 2 | 3 | 3 | 1 | 2 |
| | | | 1 | 2 | 2 | 0 | 0 | 1 | 1 | 1 |
| | | | 2 | 1 | 1 | 3 | 2 | 2 | 2 | 1 |
| | | | 2 | 1 | 3 | 1 | 2 | 0 | 2 | 1 |
| | | | 2 | 3 | 1 | 1 | 2 | 2 | 0 | 1 |
| | | | 3 | 2 | 2 | 2 | 1 | 1 | 1 | 0 |

FIG.7

DETERMINATION OF SELECTED SHIFT POSITION
FROM AMONG FOUR SHIFT POSITIONS (2)

|  | R | N | REFERENCE POSITION | D |
|---|---|---|---|---|
| FIRST SIGNAL | 1 | 1 | 1 | 0 |
| SECOND SIGNAL | 0 | 0 | 1 | 0 |
| THIRD SIGNAL | 0 | 1 | 1 | 1 |

FIG. 8

DETERMINATION OF SELECTED SHIFT POSITION
FROM AMONG FOUR SHIFT POSITIONS (3)

|  | R | N | REFERENCE POSITION | D |
|---|---|---|---|---|
| FIRST SIGNAL | 1 | 0 | 0 | 0 |
| SECOND SIGNAL | 0 | 0 | 1 | 0 |
| THIRD SIGNAL | 0 | 0 | 0 | 1 |

DETERMINATION OF SELECTED SHIFT POSITION
FROM AMONG FIVE SHIFT POSITIONS (1)

|  | R | N1 | REFERENCE POSITION | N2 | D |
|---|---|---|---|---|---|
| FIRST SIGNAL | 1 | 1 | 0 | 0 | 0 |
| SECOND SIGNAL | 0 | 1 | 1 | 1 | 0 |
| THIRD SIGNAL | 0 | 0 | 0 | 1 | 1 |

CONTROL APPARATUS AND METHOD FOR SHIFT-POSITION CHANGING MECHANISM

INCORPORATION BY REFERENCE

The disclosure of Japanese Patent Application No. 2006-299365 filed on Nov. 2, 2006 including the specification, drawings and abstract is incorporated herein by reference in its entirety.

BACKGROUND OF THE INVENTION

1. Field of the Invention

The invention relates generally to a control over a shift-position changing mechanism, and, more specifically, to a control over a shift-position changing mechanism, which provides fail-safe protection if an erroneous determination on a shift position is made when the state of a shift lever is changed.

2. Description of the Related Art

There is a shift-position changing mechanism, which changes shift positions of an automatic transmission in response to an operation of a shift lever performed by a driver, and which is provided with an electric motor (for example, a direct-current motor) as a power source for changing the shift positions.

With such shift-position changing mechanism, the shift lever and the shift-position changing mechanism need not be mechanically connected to each other, unlike a common changing mechanism that directly changes shift positions of an automatic transmission using an operational force applied to a shift lever by a driver. This eliminates the limitation on the layout of components in a vehicle, thereby providing greater flexibility to the vehicle design. In addition, the shift-position changing mechanism thus structured is more easily fitted to the vehicle.

The shift-position changing mechanism and the shift lever need not be mechanically connected to each other. A shift position command signal issued in response to the operation of the shift lever is transmitted to the shift-position changing mechanism, and the shift positions are changed based on the shift position command signal. It is therefore necessary to accurately detect the shift position command signal issued in response to the operation of the shift lever. There have been employed contactless detection methods such as a method for detecting the position, to which the shift lever has been operated, based on a change in the magnetic field caused due to the operation of the shift lever, using a magnetic-field detection sensor.

For example, Japanese Patent Application Publication No. 10-24749 (JP-A-10-24749) descries a shift-position changing device for a vehicle, which contactlessly detects the position of a shift lever, which needs minimum number of members or components, which controls a transmission without a mechanical connection between the shift-position changing device and the transmission, and which makes it possible to simplify a ducting of the shift lever. In the shift-position changing device, the shift lever is connected to a control lug having a signal surface, the control lug corresponds to a sensor, and the sensor transmits a signal corresponding to the position of the shift lever to a control unit for the transmission.

With the shift-position changing device described above, the signal transmitted from the control lug is detected, appropriately processed, and is provided to a control system for the transmission.

However, when the position, to which the shift lever has been operated, is detected using, for example, a magnetic-field detection sensor, based on a change in the magnetic field caused due to the operation of the shift lever, if the shift-position changing device is influenced by an externally-caused change in the magnetic field, which is different from a change in the magnetic field due to the operation of the shift lever, the shift-position changing device sometimes makes an erroneous determination on the shift position indicated by a command signal issued in response to the operation of the shift lever. However, the shift-position changing device described above is configured without taking such erroneous determination into account.

Therefore, there is a likelihood that the shift-position changing device described above will erroneously regard the shift position at which the vehicle is not able to run, for example, Park or Neutral, as the shift position at which the vehicle is able to run, for example, Drive or Reverse. Conversely, there is a likelihood that the shift position changing device will erroneously regard the shift position at which the vehicle is above to run as the shift position at which the vehicle is not able to run. Accordingly, there is a likelihood that the shift position is changed to a shift position at which the vehicle behaves in a manner that does not reflect the driver's intention.

SUMMARY OF THE INVENTION

The invention relates to a control apparatus and method for a shift-position changing mechanism, which suppresses a change to a shift position at which a vehicle behaves in a manner that does not reflect the driver's intention, when an erroneous determination is made on a signal corresponding to the operation of a shift lever.

A first aspect of the invention relates to a control apparatus for a shift-position changing mechanism that changes shift positions of a transmission using a rotational force of an actuator based on a signal corresponding to the state of an operation member which is provided with a magnetic member. The control apparatus includes a detection unit that is provided on the path along which the operation member is moved, and that detects a change in the magnetic field which is caused due to a change in the position of the operation member; and a determination unit that determines the shift position corresponding to the position, to which the operation member has been operated, based on the detected change in the magnetic field and predetermined multiple modes of changes in the magnetic field, which correspond to the respective shift positions. The predetermined modes of changes in the magnetic field are set such that, when the detected change in the magnetic field is influenced by a change in the magnetic field, which is caused due to a factor that differs from the change in the position of the operation member, the likelihood that the determination unit determines that the running shift position, at which a vehicle is able to run, is selected is reduced. A second aspect of the invention relates to a control method for a shift-position changing mechanism, which includes steps that correspond to the elements of the control apparatus according to the first aspect of the invention.

According to the above-described aspects of the invention, when the operation member is moved to a position corresponding to the shift position (for example, Neutral) that differs from the shift position at which the vehicle is able to run, the likelihood that it is erroneously determined that the shift position, at which the vehicle is able to run (for example, Drive or Reverse), is selected is reduced. Accordingly, when the driver moves a shift lever to the shift position at which the vehicle stops, an erroneous determination that the shift position, at which the vehicle is able to run, is selected is prevented from being made. Therefore, it is possible to reduce the likelihood that the vehicle behaves in a manner that does not reflect the driver's intention. As a result, it is possible to suppress a change to the shift position at which the vehicle behaves in a manner that does not reflect the driver's intention, even when an erroneous determination is made on the signal corresponding to the operation of the shift lever.

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein:

FIG. 5 is a first table showing an example of multiple 3-bit combinations of digital signals, which correspond to the respective shift positions according to the first embodiment of the invention;

FIG. 6 is a table showing combinations of correct signals, combinations of signals including at least one signal that indicates an erroneous value, and the number of signals that are different between each combination of correct signals and each combination of signals including at least one signal that indicates an erroneous value;

FIG. 7 is a second table showing an example of multiple 3-bit combinations of digital signals, which correspond to the respective shift positions according to the first embodiment of the invention;

FIG. 8 is a third table showing an example of multiple 3-bit combinations of digital signals, which correspond to the respective shift positions according to the first embodiment of the invention;

DETAILED DESCRIPTION OF THE EMBODIMENTS

Figure 1:
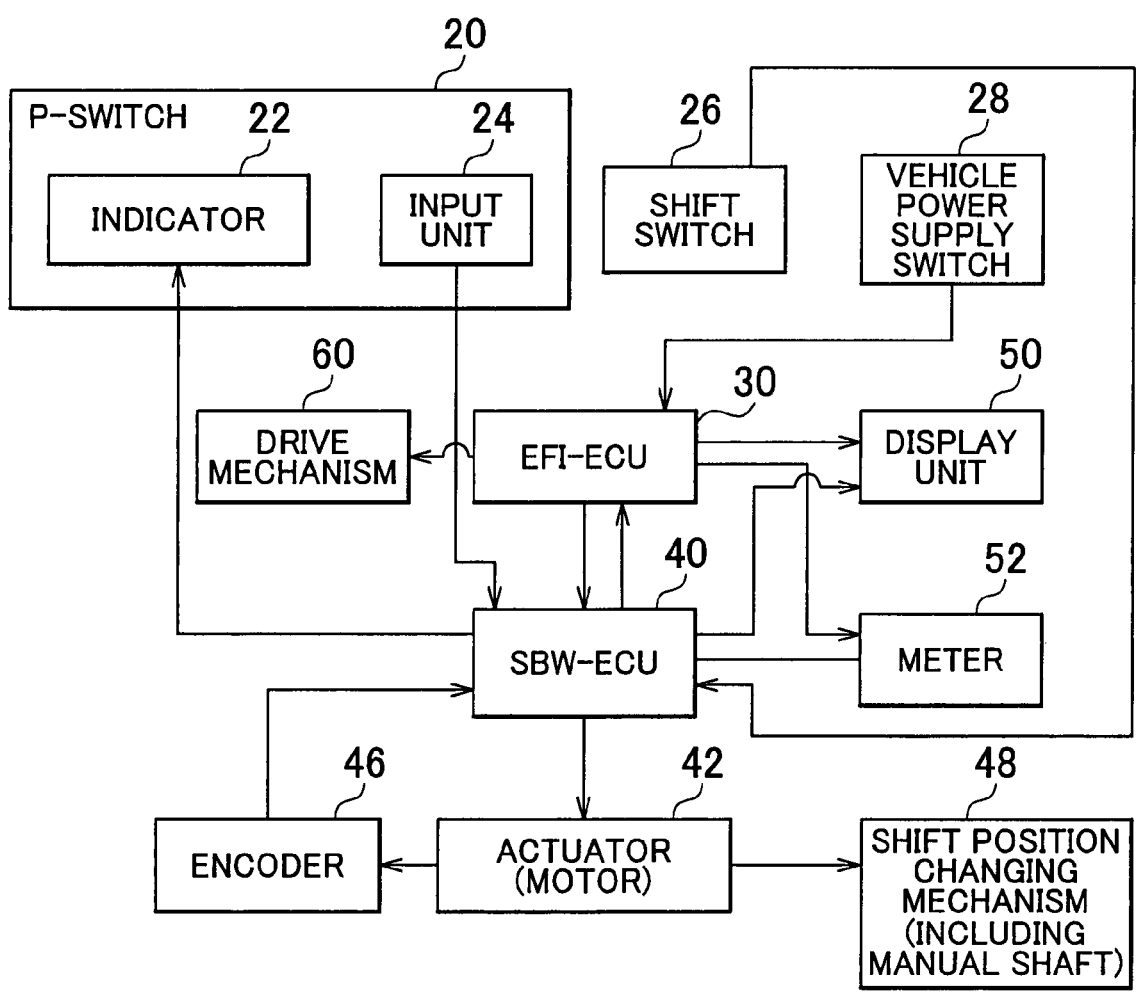
FIG. 1 is a view showing the structure of a control system for a shift-position changing mechanism according to a first embodiment of the invention.

Hereafter, embodiments of the invention will be described with reference to the accompanying drawings. In the description below, the same or corresponding components and steps will be denoted by the same reference numerals. The functions and the names of the components and steps having the same reference numerals are also the same. Accordingly, detailed description on the components and steps having the same reference numerals will be provided only once below.

FIG. 1 shows the structure of a shift control system 10 including a control apparatus for a shift-position changing mechanism 48 according to the first embodiment of the invention. The shift control system 10 is used to change the shift positions for a vehicle. The shift control system 10 includes a P-switch 20, a shift switch 26, a vehicle power supply switch 28, a vehicle control unit (hereinafter, referred to as an "EFI-ECU (Electronic Control Unit)") 30, a parking control unit (hereinafter, referred to as an "SBW (Shift-by-Wire)-ECU") 40, an actuator 42, an encoder 46, a shift-position changing mechanism 48, a display unit 50, a meter 52, and a drive mechanism 60. The shift control system 10 functions as a "Shift-by-Wire" system that changes the shift positions under electric control. More specifically, the shift-position changing mechanism 48 is driven by the actuator 42 to change the shift positions.

The vehicle power supply switch 28 is used to change the on/off state of an electric power supply for a vehicle. Any type of switch, for example, an ignition switch may be employed as the vehicle power supply switch 28. An instruction that the vehicle power supply switch 28 receives from, for example, a driver is transmitted to the EFI-ECU 30. For example, when the vehicle power supply switch 28 is turned on, electric power is supplied from an auxiliary battery (not shown) and the shift control system 10 is actuated.

The P-switch 20 is used to change the shift position between Park (hereinafter, referred to as "P") and Non-Park (hereinafter, referred to as "Non-P"). The P-switch 20 includes an indicator 22 that indicates the current shift position (P or Non-P) to the driver, and an input unit 24 that receives an instruction from the driver. The driver inputs an instruction to change the shift position to P in the P-switch 20 through the input unit 24. The input unit 24 may be a momentary switch. The instruction from the driver, which is received by the input unit 24, is transmitted to the SBW-ECU 40. A component other than the P-switch 20 may be used to change the shift position from Non-P to P.

The SBW-ECU 40 controls the actuator 42 that drives the shift-position changing mechanism 48 to change the shift position between P and Non-P. The SBW-ECU 40 causes the indicator 22 to indicate the current shift position (P or Non-P). If the driver presses the input unit 24 when the shift position is in Non-P, the SBW-ECU 40 changes the shift position to P, and causes the indicator 22 to indicate that the current shift position is in P.

The actuator 42 is formed of a switched reluctance motor (hereinafter, referred to as a "SR motor"). The actuator 42 receives an actuator control signal from the SBW-ECU 40, and drives the shift-position changing mechanism 48. The encoder 46 rotates together with the actuator 42, and detects the rotational state of the SR motor. The encoder 46 is a rotary encoder that outputs an A-phase signal, a B-phase signal and a Z-phase signal. The SBW-ECU 40 receives a signal from the encoder 46 to determine the rotational state of the SR motor, and controls a supply of electric power used to drive the SR motor.

The shift switch 26 is used to change the shift position to Drive (hereinafter, referred to as D), Reverse (hereinafter, referred to as R), or Neutral (hereinafter, referred to as N). When the shift position is in P, the shift switch 26 is used to change the shift position from P to Non-P. A shift signal that indicates an instruction from the driver, which is received by the shift switch 26, is transmitted to the SBW-ECU 40. The shift switch 26 transmits a shift signal, indicating the shift position corresponding to the position of an operation member (for example, a shift lever 200), which is selected in response to the operation by the driver, to the SBW-ECU 40. The SBW-ECU 40 executes, using the EFI-ECU 30, the control to change the shift positions in the drive mechanism 60 in accordance with the shift signal indicating the instruction from the driver, and causes the meter 52 to indicate the current shift position. The drive mechanism 60 may be formed of a multi-speed speed-change mechanism. Alternatively, the drive mechanism 60 may be formed of a continuously variable speed-change mechanism.

The shift switch 26 is formed of three magnetic-field detection sensors 220, 222 and 224. The shift lever 200 is provided with a magnetic member (for example, a permanent magnet that generates a magnetic force). The shift switch 26 detects a change in the magnetic field due to a change in the position of the shift lever 200. The shift switch 26 transmits a shift signal, which indicates the shift position determined based on the change in the magnetic field, to the SBW-ECU 40.

The shift switch 26 is formed of the magnetic-field detection sensors 220, 222 and 224 arranged at three positions on a shift gate that shows a path through which the shift lever 200 is moved. The magnetic-field detection sensors 220, 222 and 224 arranged at the three positions each transmit a signal corresponding to a change in the magnetic field caused due to a change in the positional relationship relative to the shift lever 200. The SBW-ECU 40 receives, as a shift signal, the signals from the magnetic-field detection sensors 220, 222 and 224 arranged at the three positions, and determines the selected shift position based on the received shift signal.

More specifically, each of the magnetic-field detection sensors 220, 222 and 224 arranged at the three positions outputs a voltage signal corresponding to a change in the magnetic field caused due to a change in the positional relationship relative to the shift level 200. The voltage signal undergoes analog-digital conversion (hereinafter, referred to as "A/D conversion") using a predetermined value as a threshold value.

For example, when the value indicated by an output signal from the magnetic-field detection sensor 220, 222 or 224 exceeds a predetermined value and changes such that the shift lever 200 comes closer to the magnetic-field detection sensor, a signal indicating "1" is produced. When the value indicated by an output signal from the magnetic-field detection sensor 220, 222 or 224 exceeds a predetermined value and changes such that the shift lever 200 moves away from the magnetic-field detection sensor, a signal indicating "0" is produced. The output values from the magnetic-field detection sensors 220, 222 and 224 are each converted into a 1-bit digital signal.

The A/D conversion may be implemented by hardware, for example, a digital conversion circuit included in the SBW-ECU 40. Alternatively, the A/D conversion may be implemented by software, for example, a digital conversion program executed by the SBW-ECU 40. Further alternatively, the magnetic-field detection sensors 220, 222 and 224 may each directly output a 1-bit digital signal based on the position of the shift lever 200.

The SBW-ECU 40 determines the position of the shift lever 200 based on the combination of digital signals each indicating "1" or "0", which are produced based on the output values from the magnetic-field detection sensors 220, 222 and 224 arranged at the three positions. Namely, the SBW-ECU 40 receives a 3-bit combination of three 1-bit digital signals (hereinafter, referred to as a "3-bit combination of digital signals") as a shift signal, and determines the position of the shift lever 200 based on the received 3-bit combination of digital signals.

More specifically, predetermined multiple 3-bit combinations of digital signals, which correspond to the respective shift positions are stored in the memory of the SBW-ECU 40. The SBW-ECU 40 determines the position of the shift lever 200 based on the result of comparison between the 3-bit combination of digital signals produced based on the output values from the magnetic-field detection sensors 220, 222 and 224 arranged at the three positions, and the predetermined multiple 3-bit combinations of digital signals, which correspond to the respective shift positions.

The magnetic-field detection sensors 220, 222 and 224 are not limited to a particular type. For example, magnetometers such as hall integrated circuits (hall ICs) or magnet resistance (MR) elements may be used as the magnetic-field detection sensors 220, 222 and 224.

The shift lever 200 is provided with a momentary mechanism that returns the shift lever 200 to a predetermined reference position unless the driver maintains the shift lever 200 at a position reached after a positional change.

The EFI-ECU 30 comprehensively controls the operation of the shift control system 10. The display unit 50 indicates an instruction, an alert, etc. provided from the EFI-ECU 30 or the SBW-ECU 40 to the drivel The meter 52 indicates the conditions of the vehicle components and the current shift position.

Figure 2:
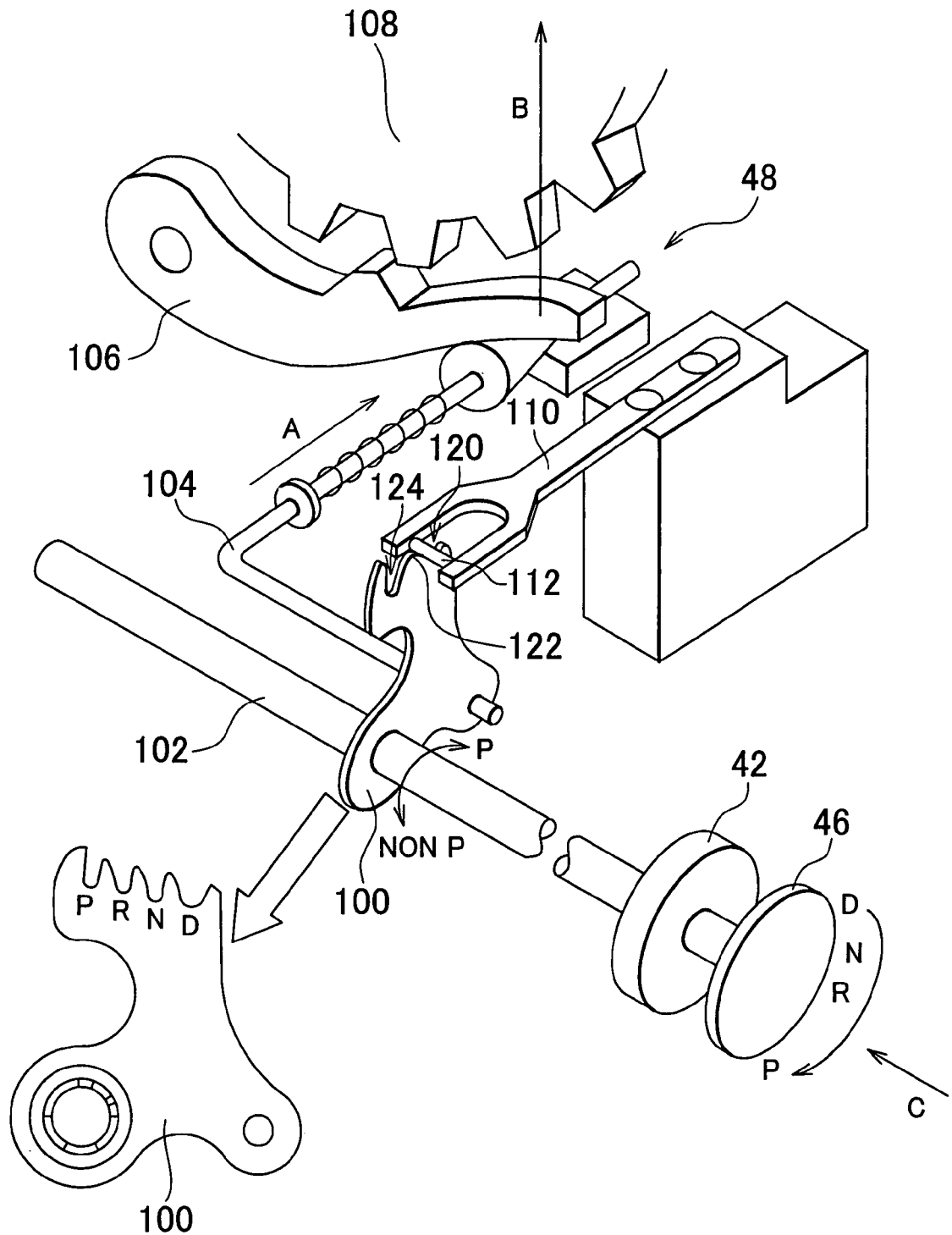
FIG. 2 is a view showing the structure of the shift-position changing mechanism.

FIG. 2 shows the structure of the shift-position changing mechanism 48. The shift positions include P and Non-P including R, N, and D. Non-P may include, in addition to D, D1 at which first gear is always selected and D2 at which second gear is always selected.

The shift-position changing mechanism 48 includes a shaft 102 that is rotated by the actuator 42, a detent plate 100 that rotates along with the shaft 102, a rod 104 that operates in accordance with the rotation of the detent plate 100, a parking lock gear 108 that is fixed to the output shaft of a transmission (not shown), a parking lock gear locking pawl 106 that is used to lock the parking lock gear 108, a detent spring 110 that restricts the rotation of the detent plate 100 to fix the shift position at a predetermined shift position, and a roller 112. The detent plate 100 is driven by the actuator 42, thereby changing the shift positions. The encoder 46 functions as counting means for obtaining a count value corresponding to the rotation amount of the actuator 42.

In the perspective view in FIG. 2, only two of the indentations formed in the detent plate 100 (an indentation 124 corresponding to P and an indentation 120 corresponding to one of Non-P) are shown. However, the detent plate 100 actually has four indentations corresponding to D, N, R and P, as shown in the enlarged plane view of the detent plate 100 in FIG. 2. Changing of the shift position between P and Non-P will be described below. However, the invention is not limited to changing of the shift position between P and Non-P.

FIG. 2 shows the state in which the shift position is in Non-P. In this state, because the parking lock gear locking pawl 106 does not lock the parking lock gear 108, the rotation of the drive shaft of the vehicle is not interfered with. If the shaft 102 is then rotated in the clockwise direction, when viewed in the direction of the arrow C, by the actuator 42, the rod 104 is pressed via the detent plate 100 in the direction of the arrow A in FIG. 2, whereby the parking lock gear locking pawl 106 is pushed up in the direction of the arrow B in FIG. 2 by a tapered portion provided at the tip of the rod 104. As the detent plate 100 rotates, the roller 112 of the detent spring 110, which is positioned at one of the two indentations formed at the top portion of the detent plate 100, namely, the indentation 120 corresponding to Non-P, climbs over a crest 122 and moves into the other indentation, namely, the indentation 124 corresponding to P. The roller 112 is fitted to the detent spring 110 so as to be rotatable about its axis. When the detent plate 100 rotates until the roller 112 reaches the indentation 124 corresponding to P, the parking lock gear locking pawl 106 is pushed up to a position at which the projection of the parking lock gear locking pawl 106 is placed between the teeth of the parking lock gear 108. Thus, the drive shaft of the vehicle is mechanically fixed, and the shift position is changed to P.

In the shift control system 10, the SBW-ECU 40 controls the rotation amount of the actuator 42 so that the impact caused when the roller 112 of the detent spring 110 drops into an indentation after climbing over the crest 122 is reduced to reduce the load placed on the components of the shift-position changing mechanism 48, such as the detent plate 100, the detent spring 110 and the shaft 102.

The SBW-ECU 40 determines that the shift position is in P, when the rotation stop position of the actuator 42, which is determined based on the rotation amount of the actuator 42 detected by the encoder 46, namely, the position of the roller 112 relative to the detent plate 100 is within the predetermined range corresponding to P.

On the other hand, when the rotation stop position of the actuator 42, which is determined based on the rotation amount of the actuator 42 detected by the encoder 46, namely, the position of the roller 112 relative to the detent plate 100 is within the predetermined range corresponding to Non-P including D, R and N, the SBW-ECU 40 determines that the shift position is in Non-P.

The SBW-ECU 40 detects the rotation amount of the actuator 42 based on a counter value detected by the encoder 46.

The SBW-ECU 40 sets the rotation stop positional-range corresponding to each shift position based on the rotation amount of the actuator 42, which is restricted by the detent plate 100.

In the thus configured shift control system 10, the SBW-ECU 40 determines the shift position corresponding to the position to which the shift lever 200 has been operated, based on changes in the magnetic field detected by the magnetic-field detection sensors 220, 222 and 224, and the predetermined multiple modes of changes in the magnetic field, which correspond to the respective shift positions. The predetermined modes of changes in the magnetic field are set such that, when one of the output values from the magnetic-field detection sensors arranged at the three positions is influenced by a change in the magnetic field (hereinafter, such a change will be referred to as an "external factor-based change in the magnetic field") due to a factor different from a change in the position of the shift lever 200, the likelihood that it will be determined that the shift lever 200 is at a position corresponding to a shift position at which the vehicle is able to run (hereinafter, referred to as a "running shift position") is reduced.

Each of the predetermined 3-bit combinations of digital signals is set such that, when one of the output values from the magnetic-field detection sensors arranged at the three positions is influenced by an external factor-based change in the magnetic field, the likelihood that it will be determined that the shift lever 200 is at a position corresponding to a shift position different from the running shift positions is increased.

The running shift positions are D and R. The shift positions different from the running shift positions are N and the shift position that indicates the reference position.

Hereafter, the manner in which the selected shift position is determined using the magnetic-field detection sensors 220, 222 and 224 arranged at the three positions will be described in detail.

Figure 3:
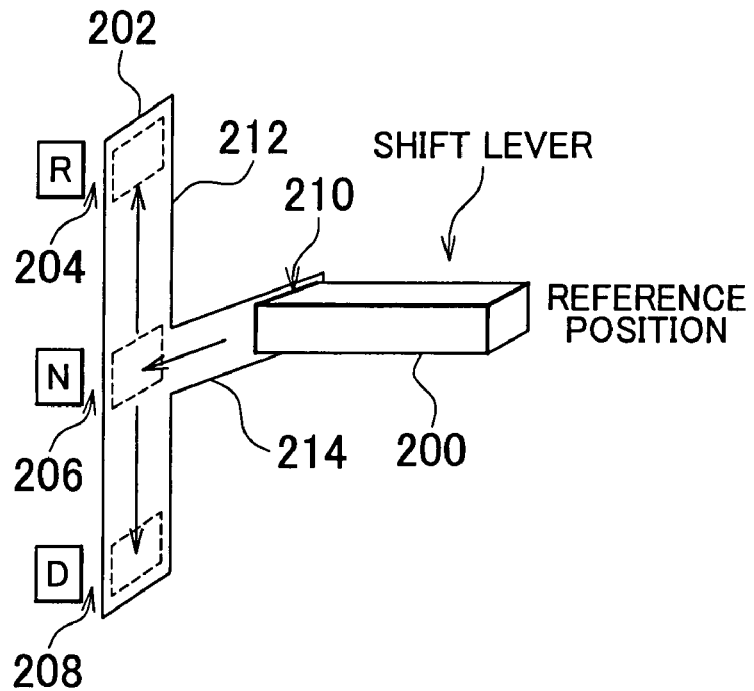
FIG. 3 is a first view showing the structure of an operation device according to the first embodiment of the invention.

As shown in FIG. 3, the shift control system 10 further includes a shift gate 202 that has a shape obtained by turning a T-shaped passage 90 degrees in the counterclockwise direction, and the shift lever 200.

The shift gate 202 includes a passage 212 that is formed in the up-and-down direction in FIG. 3, and a passage 214 that is formed in the direction perpendicular to the passage 212. One end of the passage 214 is connected to the center portion of the passage 212. The shift lever 200 is provided so as to be movable along the path formed in the shift gage 202.

The shift positions are set on the path, which is formed in the shift gate 202 and along which the shift lever 200 is moved. The shift positions are set at the ends of the passage 212 and the ends of the passage 214. R is set at an end portion 204 at the upper end of the passage 212, and D is set at an end portion 208 at the lower end of the passage 212, in FIG. 3. The shift position indicating the reference position is set at an end portion 210 at the right end of the passage 124, and N is set at a position 206 at which the passages 212 and 214 are connected to each other, in FIG. 3.

The shift lever 200 is provided with the momentary mechanism of which the reference position is the end portion 210 of the passage 214. When the driver does not apply an operational force to the shift lever 200, the shift lever 200 is returned to the reference position by an elastic force of an elastic member, for example, a spring.

Figure 4:
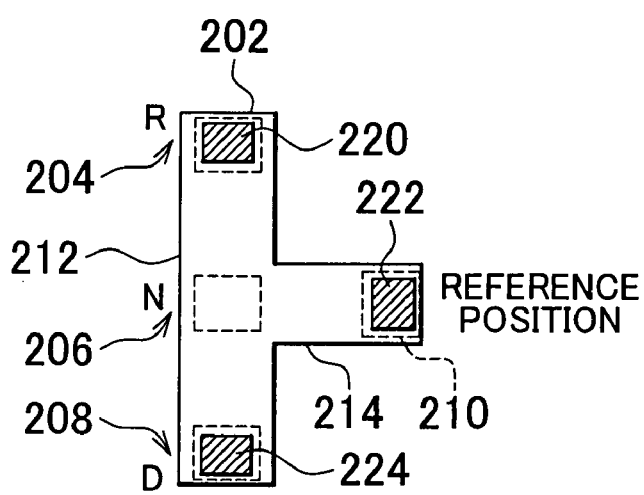
FIG. 4 is a second view showing the structure of the operation device according to the first embodiment of the invention.

The thus formed shift gate 202 is provided with the magnetic-field detection sensors 220, 222 and 224 at the predetermined positions, as shown in FIG. 4. A magnetic resistance element is arranged in each of the magnetic-field detection sensors 220, 222 and 224. As the shift lever 200 approaches the magnetic-field detection sensor, a resistance of the magnetic resistance element increases and the output voltage from the magnetic-field detection sensor decreases. The manner in which the output voltage from the magnetic-field detection sensor changes is not limited to the manner described above.

As shown in FIG. 4, the magnetic-field detection sensor 220 is provided in the passage 212 of the shift gate 202, at a position corresponding the end portion 204. When the shift lever 200 is moved to R, the output voltage from the magnetic-field detection sensor 220 decreases as the shift lever 200 approaches the magnetic-field detection sensor 220. When the output value from the magnetic-field detection sensor 220 becomes equal to or lower than a predetermined threshold value Va, the value, which is indicated by a 1-bit first digital signal (hereinafter, referred to as a "first signal") and which is based on the output value from the magnetic-field detection sensor 220, is changed from "0" to "1".

The magnetic-field detection sensor 222 is provided in the passage 214 of the shift gate 202, at a position corresponding to the end portion 210. When the shift lever 200 is moved to the shift position indicating the reference position, the output voltage from the magnetic-field detection sensor 222 decreases as the shift lever 200 approaches the magnetic-field detection sensor 222. When the output value from the magnetic-field detection sensor 222 becomes equal to or lower than the predetermined threshold value Va, the value, which is indicated by a 1-bit second digital signal (hereinafter, referred to as a "second signal") and which is based on the output value from the magnetic-field detection sensor 222, is changed from "0" to "1".

The magnetic-field detection sensor 224 is provided in the passage 212 of the shift gate 202, at a position corresponding to the end portion 208. When the shift lever 200 is moved to D, the output voltage from the magnetic-field detection sensor 224 decreases as the shift lever 200 approaches the magnetic-field detection sensor 224. When the output value from the magnetic-field detection sensor 224 becomes equal to or lower than the predetermined threshold value Va, the value, which is indicated by a 1-bit third digital signal (hereinafter, referred to as a "third signal") and which is based on the output value from the magnetic-field detection sensor 224, is changed from "0" to "1".

The output values from the magnetic-field detection sensors 220, 222 and 224 are converted into digital signals by the SBW-ECU 40.

The magnetic-field detection sensor 220, 222 and 224 have the same characteristics except the positions at which they are arranged. When being distant from the shift lever 200, each of the magnetic-field detection sensors 220, 222 and 224 outputs the output value V(0). When the distance from the shift lever 200 becomes equal to or shorter than a predetermined value, each of the magnetic-field detection sensors 220, 222 and 224 outputs the output value V(1). However, it is not necessary to use the sensors having the same characteristics for all the magnetic-field detection sensors 220, 222 and 224.

The SBW-ECU 40 determines the selected shift position based on the result of comparison between the 3-bit combination of digital signals produced based on the output values from the magnetic-field detection sensors 220, 222 and 224, and the predetermined multiple 3-bit combinations of digital signals, which correspond to the respective shift positions.

As shown in FIG. 5, the 3-bit combination of digital signals that are the first signal indicating "1", the second signal indicating "0" and the third signal indicating "0" corresponds to R.

The 3-bit combination of digital signals that are the first signal indicating "1", the second signal indicating "0", and the third signal indicating "1" corresponds to N.

The 3-bit combination of digital signals that are the first signal indicating "0", the second signal indicating "1", and the third signal indicating "0" corresponds to the shift position indicating the reference position.

The 3-bit combination of digital signals that are the first signal indicating "0", the second signal indicating "0" and the third signal indicating "1" corresponds to D.

The detection characteristics and arrangement of the magnetic-field detection sensors 220, 222 and 224 are set such that the above-described 3-bit combinations of digital signals are output when the shift lever 200 is at the corresponding shift positions.

Setting the predetermined multiple 3-bit combinations of digital signals, which correspond to the respective shift positions, enables the SBW-ECU 40 to determine the position of the shift lever 200.

The 3-bit combination of digital signals produced based on the output values from the magnetic-field detection sensors 220, 222 and 224 arranged at the three positions may be changed under the influence of an external factor-based change in the magnetic field. An external factor-based change in the magnetic field occurs, for example, when a member that generates a magnetic force and that differs from the shift lever 200 comes close to the magnetic-field detection sensors 220, 222 and 224.

This is because, even when the shift lever 200 is distant from the magnetic-field detection sensors 220, 222 and 224, the output value from one of these sensors may be similar to the value that is output when the shift lever 200 comes close to these sensors. Accordingly, the multiple 3-bit combinations of digital signals, which correspond to the respective shift positions, are set such that, when the combination of digital signals produced based on the output values from the magnetic-field detection sensors 220, 222 and 224 is influenced by an external factor-based change in the magnetic field, the likelihood that it will be determined that the shift lever 200 is at a position corresponding to the running shift position is reduced.

As shown in FIG. 6, there are eight 3-bit combinations of digital signals that are the first signal, the second signal and the third signal. The eight combinations are the combination X1 to the combination X8.

The 3-bit combinations X1 to X8 of digital signals shown in FIG. 6 are the correct shift signals, and the 3-bit combinations Y1 to Y8 of digital signals shown in FIG. 6 are the erroneous shift signals. In addition, FIG. 6 shows the number of values different between each of the combinations X1 to X8 and each of the combinations Y1 to Y8.

For example, the first, the second, and the third signals in the combination X1 are equal to the first, the second, and the third signals in the combination Y1, respectively. Accordingly, the number of values different between the combination X1 and the combination Y1 is "0".

The first, the second, and the third signals in the combination X3 are different from the first, the second, and the third signals in the combination Y6, respectively. Accordingly, the number of values different between the combination X3 and the combination Y6 is "3".

The first and the third signals in the combination X5 are different from the first and the third signals in the combination Y7, respectively. Accordingly, the number of values different between the combination X5 and the combination Y7 is "2".

Namely, as the number of values different between the combinations decreases, the likelihood that an erroneous determination will increase. For example, when the combination X2 is the 3-bit combination of digital signals, which corresponds to D, and the combination X5 is the 3-bit combination of digital signals, which corresponds to R, the following inconvenience may occur.

When the shift lever 200 is moved to the position corresponding to D, if the second signal indicating an erroneous value is produced due to the influence of an external factor-based magnetic field, the SBW-ECU 40 may erroneously determine that the shift lever 200 is at the position corresponding to R. Therefore, the shift position that does not reflect the drive's intention may be selected. Especially, when D or R is selected as a result of such an erroneous determination, the vehicle may behave in a manner that does not reflect the driver's intention.

Accordingly, the 3-bit combination X4 of digital signals is used as the combination that corresponds to R, the 3-bit combination X6 of digital signals is used as the combination that corresponds to N, the 3-bit combination X3 of digital signals is used as the combination that corresponds to the shift position indicating the reference position, and the 3-bit combination X2 of digital signals is used as the combination that corresponds to D.

The number of values different between the combination X2 and the combination X4 (i.e. the combination Y4) is "2". Accordingly, the likelihood that the combination X2 will be erroneously regarded as the combination X4 (i.e. Y4) or that the combination X4 will be erroneously regarded as the combination X2 (i.e. Y2) is low. Therefore, it is possible to avoid a mix-up between R and D, thereby minimizing the likelihood of an erroneous determination.

The number of values different between the combination X4 and the combination X6 (i.e. Y6) is "1". Accordingly, there is a likelihood that a mix-up between the combination X4 and the combination X6 (i.e. Y6) will be caused by outputting the third signal indicating an erroneous value. Namely, there is a likelihood that a mix-up will be caused between R and N, which results in an erroneous determination on these positions.

When the magnetic-field detection sensor 224 is influenced by an external factor-based change in the magnetic field, the reluctance of the magnetic resistance element arranged in the magnetic-field detection sensor 224 tends to increase. Accordingly, the likelihood that the reluctance decreases due to the influence of an external factor-based change in the magnetic field is low. Namely, the likelihood that the third signal erroneously indicates "0" instead of "1" due to the influence of an external factor-based change in the magnetic field is low. Accordingly, the likelihood that a mix-up will be caused between the combination X4 and the combination X6 (i.e. Y6) is low, namely, the likelihood that the combination X6 will be erroneously regarded as the combination X4 is low. That is, the likelihood that N will be erroneously regarded as R is low.

Even if the likelihood that the combination X4 will be erroneously regarded as the combination X6 is increased, namely, even if the likelihood that R will be erroneously regarded as N is increased, the likelihood that the vehicle will behave in a manner that does not reflect the driver's intention is still low.

Therefore, the combination X4 is used as the combination that corresponds to R, and the combination X6 is used as the combination that corresponds to N. In this way, when the combination of digital signals is influenced by an external factor-based change in the magnetic field, the likelihood that R will be erroneously regarded as N is increased, while the likelihood that N will be erroneously regarded as R is reduced.

The number of values different between the combination X3 and the combination X4 (i.e. Y4) is "2". Accordingly, the likelihood that the combination X3 will be erroneously regarded as the combination X4 or the combination X4 will be erroneously regarded as the combination X3 is low. Therefore, it is possible to avoid a mix-up between R and the shift position indicating the reference position, thereby minimizing the likelihood of an erroneous determination on these positions.

The number of values different between the combination X2 and the combination X3 (i.e. Y3) is "2". Accordingly, the likelihood that the combination X2 will be erroneously regarded as the combination X3 or the combination X3 will be erroneously regarded as the combination X2 is low. Therefore, it is possible to avoid a mix-up between D and the shift position indicating the reference position, thereby minimizing the likelihood of an erroneous determination on these positions.

The number of values different between the combination X2 and the combination X6 (i.e. Y6) is "1". Accordingly, there is a likelihood that a mix-up between the combination X2 and the combination X6 (i.e. Y6) will be caused by outputting the first signal indicating an erroneous value. Namely, there is a likelihood that a mix-up will be caused between D and N, which results in an erroneous determination on these positions.

As described above, the likelihood that the reluctance will decrease due to the influence of an external factor-based change in the magnetic field is low. Namely, the likelihood that the first signal erroneously indicates "0" instead of "1" due to the influence of an external factor-based change in the magnetic field is low.

Therefore, the likelihood that the combination X6 will be erroneously regarded as the combination X2 is low.

In addition, even if the likelihood that the combination X2 will be erroneously regarded as the combination X6 is high, namely, the likelihood that D will be erroneously regarded as N is high, the likelihood that the vehicle will behave in a manner that does not reflect the driver's intention is still low.

Therefore, the combination X2 is used as the combination that corresponds to D and the combination X6 is used as the combination that corresponds to N. In this way, when the combination of digital signals is influenced by an external factor-based change in the magnetic field, the likelihood that D will be erroneously regarded as N is increased, while the likelihood that N will be erroneously regarded as D is reduced.

The number of values different between the combination X3 and the combination X6 (i.e. Y6) is "3". Accordingly, the likelihood that the combination X3 will be erroneously regarded as the combination X6 or the combination X6 will be erroneously regarded as the combination X3 is low. Therefore, it is possible to avoid a mix-up between N and the shift position indicating the reference position, thereby minimizing the likelihood of an erroneous determination on these positions.

The description of the first embodiment of the invention is provided on the assumption that the SBW-ECU 40 determines the selected shift position based on the multiple 3-bit combinations of digital signals, which correspond to the respective shift positions. However, the invention is not limited to this, as long as the likelihood that a shift position different from the running shift positions will be erroneously regarded as a running shift position is reduced.

For example, the SBW-ECU 40 may determine the selected shift position based on the multiple 3-bit combinations of digital signals, shown in FIG. 7, which correspond to the respective shift positions.

As shown in FIG. 7, the 3-bit combination X4 of digital signals, in FIG. 6, is used as the combination that corresponds to R, the 3-bit combination X6 of digital signals, in FIG. 6, is used as the combination that corresponds to N, the 3-bit combination X8 of digital signals, in FIG. 6, is used as the combination that corresponds to the shift position indicating the reference position, and the 3-bit combination X2 of digital signals, in FIG. 6, is used as the combination that corresponds to D.

The positions of the magnetic-field detection sensors 220, 222 and 224 and the characteristics of the output values may be appropriately changed such that the above-described 3-bit combinations of digital signals that are the first to third signals are output when the shift lever 200 is at the corresponding shift positions.

As shown in FIG. 6, the number of values different between the combination X4 and the combination X8 (i.e. Y8) is "2". Accordingly, the likelihood that the combination X4 will be erroneously regarded as the combination X8 or the combination X8 will be erroneously regarded as the combination X4 is low. Therefore, it is possible to avoid a mix-up between R and the shift position indicating the reference position, thereby minimizing the likelihood of an erroneous determination on these positions.

The number of values different between the combination X6 and the combination X8 (i.e. Y8) is "1". Accordingly, there is a likelihood that a mix-up between the combination X6 and the combination X8 (i.e. Y8) will be caused by outputting the second signal indicating an erroneous value. Namely, there is a likelihood that a mix-up will be caused between N and the shift position indicating the reference position, which results in an erroneous determination on these positions.

As described above, the likelihood that the reluctance will decrease due to the influence of an external factor-based change in the magnetic field is low. Namely, the likelihood that the second signal erroneously indicates "0" instead of "1" due to the influence of an external factor-based change in the magnetic field is low. Therefore, the likelihood that the combination X8 will be erroneously regarded as the combination X6 is low.

In addition, even if the likelihood that the combination X6 will be erroneously regarded as the combination X8 is high, namely, the likelihood that N will be erroneously regarded as the shift position indicating the reference position is high, the likelihood that the vehicle will behave in a manner that does not reflect the driver's intention is still low.

Therefore, the combination X6 is used as the combination that corresponds to N, and the combination X8 is used as the combination that corresponds to the shift position corresponding to the reference position. In this way, when the combination of digital signals is influenced by an external factor-based change in the magnetic field, the likelihood that N will be erroneously regarded as the shift position indicating the reference position is increased, while the likelihood that the reference position will be erroneously degraded as N is reduced.

The number of values different between the combination X2 and the combination X8 (i.e. Y8) is "2". Accordingly, the likelihood that the combination X2 will be erroneously regarded as the combination X8 or the combination X8 will be erroneously regarded as the combination X2 is low. Therefore, it is possible to avoid a mix-up between D and the shift position indicating the reference position, thereby minimizing the likelihood of an erroneous determination on these positions.

For example, the SBW-ECU 40 may determine the selected shift position based on the multiple 3-bit combinations of digital signals, shown in FIG. 8, which correspond to the respective shift positions.

As shown in FIG. 8, the 3-bit combination X4 of digital signals, in FIG. 6, is used as the combination that corresponds to R, the 3-bit combination X1 of digital signals, in FIG. 6, is used as the combination that corresponds to N, the 3-bit combination X3 of digital signals, in FIG. 6, is used as the combination that corresponds to the shift position indicating the reference position, and the 3-bit combination X2 of digital signals, in FIG. 6, is used as the combination that corresponds to D.

The positions of the magnetic-field detection sensors 220, 222 and 224 and the characteristics of the output values may be appropriately changed such that the above-described 3-bit combinations of digital signals that are the first to third signals are output when the shift lever 200 is at the corresponding shift positions.

As shown in FIG. 6, the number of values different between the combination X4 and the combination X3 (i.e. Y3) is "2". Accordingly, the likelihood that the combination X4 will be erroneously regarded as the combination X3 or the combination X3 will be erroneously regarded as the combination X4 is low. Therefore, it is possible to avoid a mix-up between R and the shift position indicating the reference position, thereby minimizing the likelihood of an erroneous determination on these positions.

The number of values different between the combination X1 and the combination X3 (i.e. Y3) is "1". Accordingly, there is a likelihood that a mix-up between the combination X1 and the combination X3 (i.e. Y3) will be caused by outputting the second signal indicating an erroneous value. Namely, there is a likelihood that a mix-up will be caused between N and the shift position indicating the reference position, which results in an erroneous determination on these positions.

As described above, the likelihood that the reluctance will decrease due to the influence of an external factor-based change in the magnetic field is low. Namely, the likelihood that the second signal erroneously indicates "0" instead of "1" due to the influence of an external factor-based change in the magnetic field is low. Therefore, the likelihood that the combination X3 will be erroneously regarded as the combination X1 is low.

In addition, even if the likelihood that the combination X1 will be erroneously regarded as the combination X3 is high, namely, the likelihood that N will be erroneously regarded as the shift position indicating the reference position is high, the likelihood that the vehicle will behave in a manner that does not reflect the driver's intention is still low.

Therefore, the combination X1 is used as the combination that corresponds to N, and the combination X3 is used as the combination that corresponds to the shift position corresponding to the reference position. In this way, when the combination of digital signals is influenced by an external factor-based change in the magnetic field, the likelihood that N will be erroneously regarded as the shift position indicating the reference position is increased, while the likelihood that the reference position will be erroneously degraded as N is reduced.

The number of values different between the combination X2 and the combination X3 (i.e. Y3) is "2". Accordingly, the likelihood that the combination X2 will be erroneously regarded as the combination X3 or the combination X3 will be erroneously regarded as the combination X2 is low. Therefore, it is possible to avoid a mix-up between D and the shift position indicating the reference position, thereby minimizing the likelihood of an erroneous determination on these positions.

Figure 9:
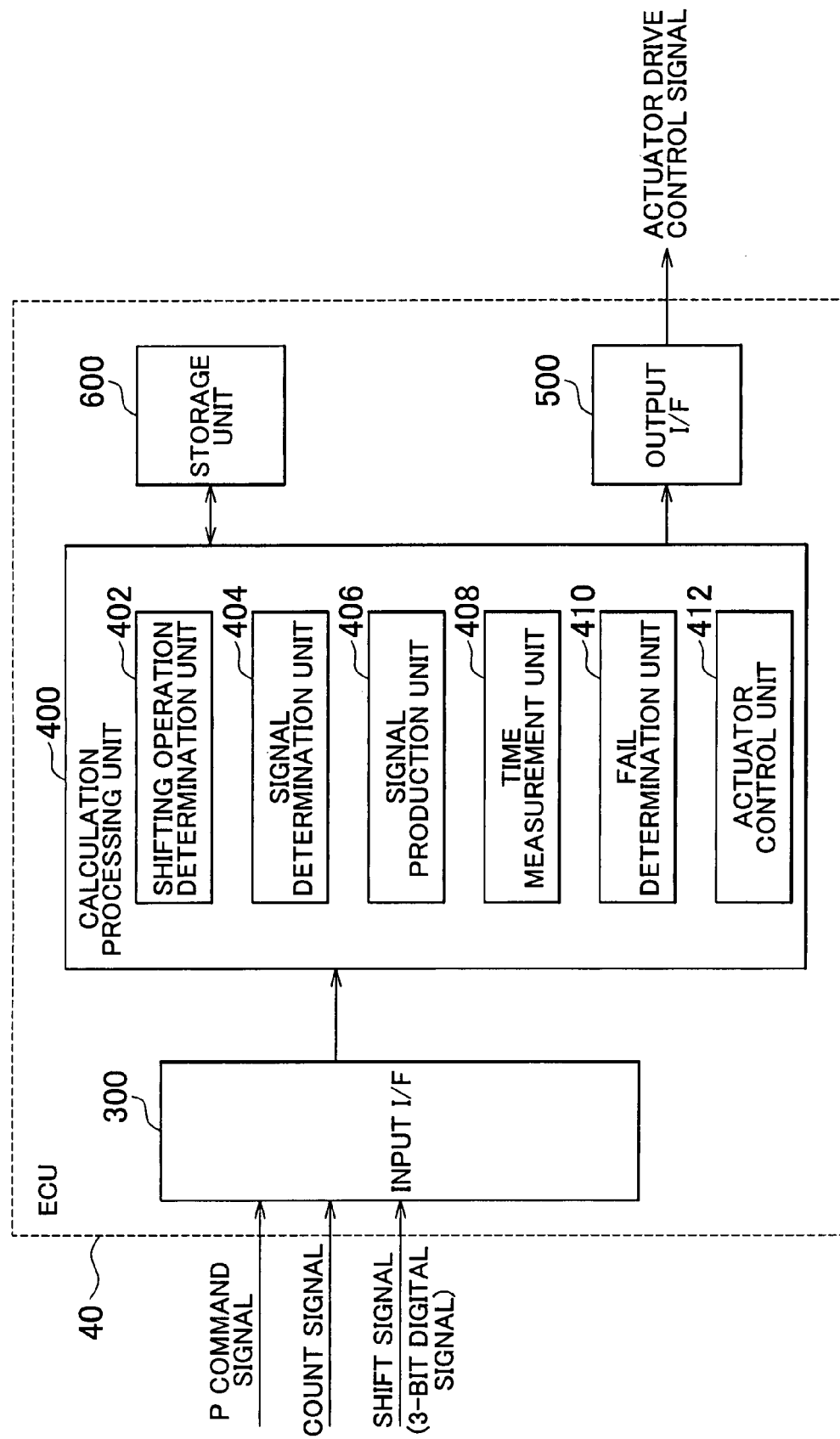
FIG. 9 is a functional block diagram of an SBW-ECU according to the first embodiment of the invention.
Figure 10:
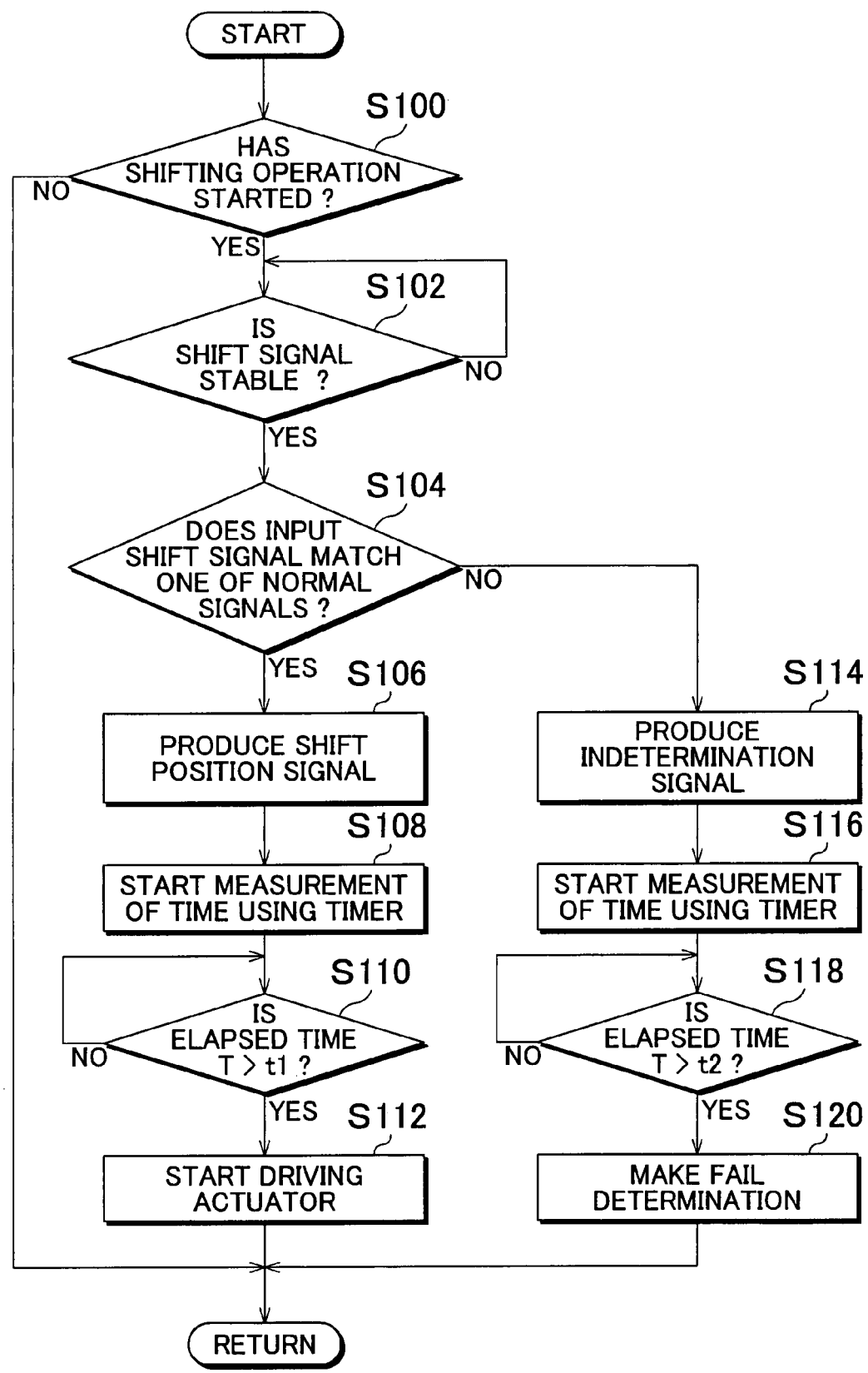
FIG. 10 is a flowchart of the routine executed by the SBW-ECU according to the first embodiment of the invention.

FIG. 9 is a functional block diagram of the SBW-ECU 40.

The SBW-ECU 40 includes an input interface (hereinafter, referred to as an "input I/F") 300, a calculation processing unit 400, a storage unit 600, and an output interface (hereinafter, referred to as an "output I/F") 500.

The input I/F 300 receives a P-command signal from the P-switch 20, a count signal from the encoder 46, and a shift signal from the shift switch 26, and transmits these signals to the calculation processing unit 400.

The calculation processing unit 400 includes a shifting operation determination unit 402, a signal determination unit 404, a signal production unit 406, a time measurement unit 408, a fail determination unit 410, and an actuator control unit 412.

The shifting operation determination unit 402 determines whether the shifting operation has started. For example, the shifting operation determination unit 402 determines that the shifting operation has started when receiving a shift signal from the shift switch 26. The shift signal is a 3-bit combination of digital signals, as described above. When the shifting operation is started, the shifting operation determination unit 402 may set a shifting operation start determination flag.

The signal determination unit 404 determines whether a shift signal is stable. The signal determination unit 404 determines that a shift signal is not stable if a great noise is superimposed on the received shift signal or the shift signal is weak. If such a phenomenon is not detected, the signal determination unit 404 determines that the shift signal is stable. If the shift signal is stable, the signal determination unit 404 may set a signal stability determination flag. If the shift signal is stable, the signal determination unit 404 determines whether the received shift signal matches one of the normal signals. The "normal signals" are the 3-bit combinations of digital signals, which correspond to the respective shift positions, as shown in FIG. 5.

The signal determination unit 404 determines whether the 3-bit combination of first to third signals matches any one of the 3-bit combinations of digital signals, which correspond to the respective shift positions. The signal determination unit 404 may determine whether the received shift signal matches any one of the normal signals if the signal stability determination flag is on. Then, if the received shift signal matches one of the normal signals, the signal determination unit 404 may set the signal determination flag.

If the received shift signal matches one the normal signals, the signal production unit 406 produces a shift position signal corresponding to the received shift signal. The signal production unit 406 produces an indetermination signal indicating that the selected shift position has not been determined, if the received shift signal does not match any normal signals. The signal production unit 406 transmits a produced shift position signal to the actuator control unit 412. Alternatively, the signal production unit 406 transmits a produced indetermination signal to the fail determination unit 410.

The time measurement unit 408 is a timer that measures time which has elapsed since a shift position signal is produced (or since a shift position signal is transmitted to the actuator control unit 412), and stops the measurement when a predetermined time $t_1$ has elapsed. Alternatively, the time measurement unit 408 measures a time that has elapsed since an indetermination signal is produced (or since an indetermination signal is transmitted to the fail determination unit 410), and stops the measurement when a predetermined time t2 has elapsed.

The fail determination unit 410 makes a fail determination that the shift position corresponding to the position of the shift lever 200 cannot be determined, based on the indetermination signal produced by the signal production unit 406. When a fail determination is made, the fail determination unit 410 may set a fail determination flag.

The actuator control unit 412 transmits an actuator drive control signal to the actuator 42 via the output I/F 500 such that the shift position is changed to the shift position indicated by the shift position signal produced by the signal production unit 406. Note that, the actuator control unit 412 may not execute the shift-position changing control when the fail determination flag is on.

The description of the first embodiment of the invention is provided on the assumption that each of the shifting operation determination unit 402, the signal determination unit 404, the signal production unit 406, the time measurement unit 408, the fail determination unit 410 and the actuator control unit 412 functions as software that is implemented when a CPU (Central Processing Unit), which is the calculation processing unit 400, executes the program stored in the storage unit 600. Alternatively, each of the above-mentioned units may be implemented by hardware. These programs are stored in the recording medium mounted in the vehicle.

Various information such as the 3-bit combinations of digital signals, which correspond to the respective shift positions, the programs, the threshold value, the maps, etc. are stored in the storage unit 600. The calculation processing unit 400 reads the data from the storage unit 600 or stores the data in the storage unit 600.

Hereafter, the routine of the program executed by the SBW-ECU 40 will be described below.

In Step (hereinafter, step will be referred to as "S") 100, the SBW-ECU 40 determines whether the shifting operation has started. If it is determined that the shifting operation has started ("YES" in S100), S102 is executed. On the other hand, if it is determined that the shifting operation has not started ("NO" in S100), the routine ends.

In S102, the SBW-ECU 40 determines whether the shift signal is stable. If it is determined that the shift signal is stable ("YES" in S102), S104 is executed. On the other hand, if it is determined that the shift signal is not stable ("NO" in S102), S102 is executed again.

In S104, the SBW-ECU 40 determines whether the received shift signal matches any one of the normal signals. If it is determined that the received shift signal matches one the normal signals ("YES" in S104), S106 is executed. On the other hand, if it is determined that the received shift signal does not match any normal signals ("NO" in S104), S114 is executed.

In S106, the SBW-ECU 40 produces a shift position signal corresponding to the received shift signal.

In S108, the SBW-ECU 40 starts the time measurement using the timer. More specifically, the SBW-ECU 40 resets the count value of the timer, and starts adding up a predetermined count value at every calculation cycle.

In S110, the SBW-ECU 40 determines whether the elapsed time T is longer than a predetermined time t1. More specifically, the SBW-ECU 40 determines whether the current count value is larger than the count value that indicates a lapse of time t1. If the elapsed time T is longer than the predetermined time t1 ("YES" in S110), S112 is executed. On the other hand, if the elapsed time T is equal to or shorter than the predetermined time t1 ("NO" in S110), S110 is executed again.

In S112, the SBW-ECU 40 drives the actuator 42 based on the produced shift position signal. Namely, the SBW-ECU 40 controls the actuator 42 such that the shift position is changed to the shift position indicated by the shift position signal.

In S114, the SBW-ECU 40 produces an indetermination signal.

In S116, the SBW-ECU 40 starts the measurement of time using the timer.

In S118, the SBW-ECU 40 determines whether the elapsed time T is longer than a predetermined time t2. If the elapsed time T is longer than the predetermined time t2 ("YES" in S118), S120 is executed. On the other hand, if the elapsed time T is equal to or shorter than the predetermined time t2 ("NO" in S118), S118 is executed again.

In S120, the SBW-ECU 40 makes a fail determination.

The SBW-ECU 40 has the above-described structure, and executes the control according to the above-described flowchart. The operation of the SBW-ECU 40 will be described with reference to FIG. 11A to FIG. 11C and FIG. 12A to FIG. 12D.

Figure 11A:
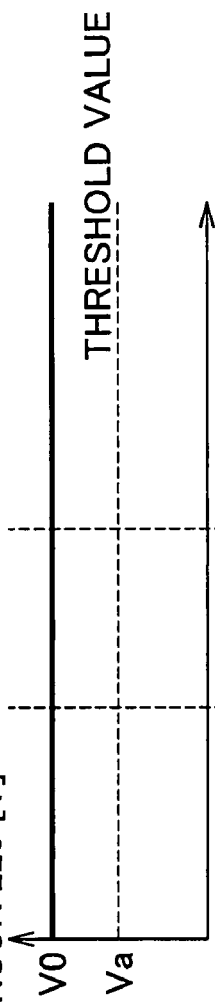
FIGS. 11A, 11B and 11C are timing-charts showing the manners in which the output voltages from magnetic-field detection sensors change.

The shift lever 200 is returned to the reference position, when the driver does not apply an operational force to the shift lever 200. In this case, the output value from the magnetic-field detection sensor 220 is V0, as shown in FIG. 11A. This is because the magnetic field detected by the magnetic-field detection sensor 220 is not changed due to the position of the shift lever 200.

Figure 12A:
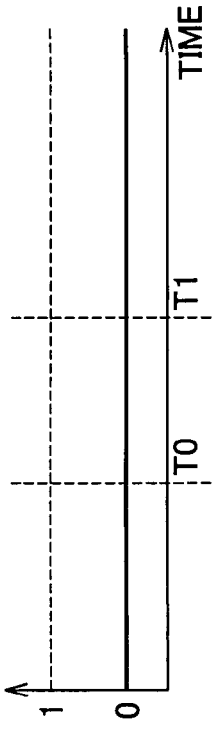
FIGS. 12A, 12B, 12C and 12D are timing-charts showing the operation of the SBW-ECU according to the first embodiment of the invention.

In this case, as shown in FIG. 12A, the value indicated by a 1-bit digital signal, which is obtained by digitalizing the output value from the magnetic-field detection sensor 220, is "0".

Figure 11B:
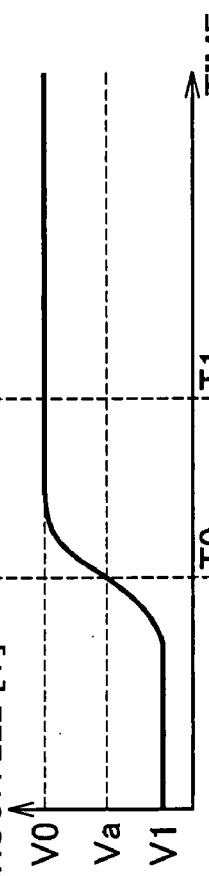

When the shift lever 200 is at the reference position, the magnetic field detected by the magnetic-field detection sensor 222 is changed due to the position of the shift lever 200. Namely, the reluctance of the magnetic resistance element arranged in the magnetic-field detection sensor 222 increases. Accordingly, the initial output value from the magnetic-field detection sensor 222 is V1, as shown in FIG. 11B. The value V1 is lower than the value V0, and also lower than the threshold value Va.

Figure 12B:

In this case, as shown in FIG. 12B, the initial value indicated by the 1-bit digital signal, which is obtained by digitalizing the initial output value from the magnetic-field detection sensor 222, is "1".

Figure 11C:
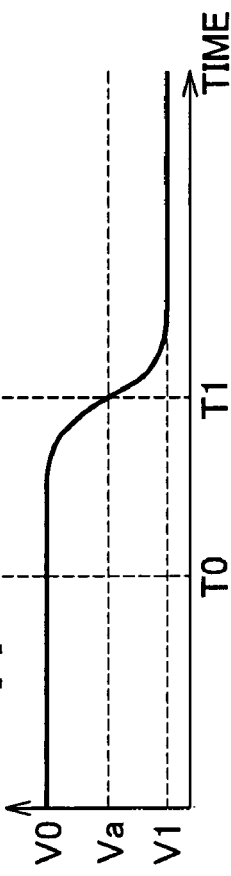

When the shift lever 200 is at the reference position, the magnetic field detected by the magnetic-field detection sensor 224 is not changed due to the position of the shift lever 200. Accordingly, as shown in FIG. 11C, the initial output value from the magnetic-field detection sensor 224 is V0.

Figure 12C:
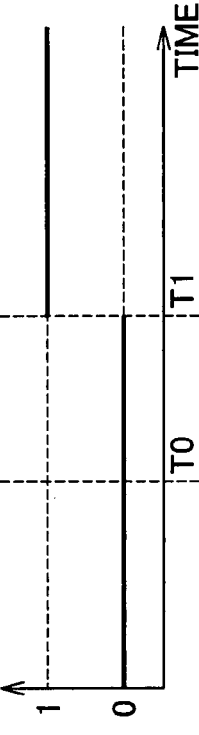

In this case, as shown in FIG. 12C, the initial value indicated by the 1-bit digital signal, which is obtained by digitalizing the initial output value from the magnetic-field detection sensor 224, is "0".

When the shift lever 200 has not been moved by the driver ("NO" in S100), S100 is periodically executed until the shift lever 200 is moved.

If the driver moves the shift lever 200 to D, the shift lever 200 moves away from the magnetic-field detection sensor 222. Accordingly, the reluctance of the magnetic resistance element arranged in the magnetic-field detection sensor 222 decreases. Therefore, as shown in FIG. 11B, the output value from the magnetic-field detection sensor 222 increases.

When the output value exceeds the threshold value Va at time T0, as shown in FIG. 12B, the value indicated by the 1-bit digital signal, which is obtained by digitalizing the output value from the magnetic-field detection sensor 222, is changed to "0".

In this case, the digital signals in the 3-bit combination are the first signal indicating "0", the second signal indicating "0", and the third signal indicating "0". Accordingly, this combination does not match any combinations shown in FIG. 5 ("NO" in S104). Note that, the interval from T0 to T1 is long enough to make an affirmative determination in S102 if the signal is actually stable.

Figure 12D:
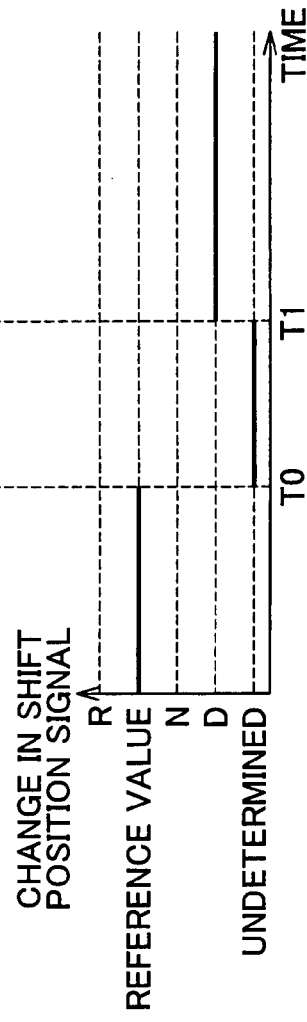

Therefore, as shown in FIG. 12D, during the time from T0 to T1, the produced shift position signal is an indetermination signal (S114). Then, after the predetermined time t2 has elapsed since the measurement is started ("YES" in S118), a fail determination is made (S120).

When the shift lever 200 is moved to D, the shift lever 200 approaches the magnetic-field detection sensor 224. Accordingly, the reluctance of the magnetic resistance element arranged in the magnetic-field detection sensor 224 increases. Therefore, as shown in FIG. 11C, the output value from the magnetic-field detection sensor 224 decreases.

When the output value becomes equal to or lower than the predetermined value Va at time T1, as shown in FIG. 12C, the value indicated by the 1-bit digital signal, which is obtained by digitalizing the output value from the magnetic-field detection sensor 224, is changed to "1".

In this case, the digital signals in the 3-bit combination are the first signal indicating "0", the second signal indicating "0", and the third signal indicating "1". Therefore, this combination matches the combination corresponding to D in FIG. 5 ("YES" in S104). Note that, it is determined in S102 that the signal becomes stable immediately after time T1.

Therefore, as shown in FIG. 12D, the produced shift position signal is determined as the shift position signal corresponding to D at time T1 (S106). Then, after the predetermined time t1 has elapsed since the measurement of time is started ("YES" in S110), the actuator 42 is driven and the shift position is changed to D (S112).

In this case, if the first signal in the 3-bit combination of digital signals, which corresponds to D, erroneously indicates "1" instead of "0", D is erroneously regarded as N. Therefore, just power transfer is shut off, and the vehicle does not behave in a manner against the driver's intention.

Even if the second signal erroneously indicates "1" instead of "0" or the third signal erroneously indicates "0" instead of "1", the combination of digital signals does not match any combinations in FIG. 5 ("NO" in S104). Accordingly, an indetermination signal is produced (S114), and a fail determination is ultimately made (S120).

As described so far, the control apparatus for the shift-position changing mechanism 48 reduces the likelihood that the shift position will be erroneously regarded as D or R when the shift lever 200 is moved to N or the shift position indicating the reference position. Accordingly, it is possible to suppress occurrence of the situation in which the vehicle behaves in a manner that does not reflect the driver's intention. Therefore, it is possible to provide the control apparatus and method for the shift-position changing mechanism 48 that suppresses occurrence of the situation in which the shift position is changed to the shift position at which the vehicle behaves in a manner that does not reflect the driver's intention, even if an erroneous determination is made on the signal corresponding to the operation of the shift lever 200.

Preferably, the 3-bit combination of digital signals, which corresponds to a shift position, for example, N or the shift position indicating the reference position, which is different from the running shift positions is set in the following manner. The values indicated by any two of the digital signals in the 3-bit combination which corresponds to N or the shift position indicating the reference position are set to be different from the values indicated by the corresponding two digital signals in the 3-bit combination which corresponds to the running shift position.

Thus, when the combination of digital signals produced based on the output values from the magnetic-field detection sensors 220, 222 and 224 is influenced by an external factor-based change in the magnetic field, the control apparatus for the shift-position changing mechanism 48 does not erroneously regard the shift position different from the running shift positions as the running shift position, unless the values indicated by at least two signals change. Accordingly, it is possible to reduce the likelihood that the shift position different from the running shift position will be erroneously regarded as the running shift position.

More preferably, the 3-bit combination of digital signals, which corresponds to a shift position different from the running shift positions, is set in the following manner. The values indicated by at least any two of the digital signals in the 3-bit combination which corresponds to the shift position different from the running shift position are set to be different from the values indicated by the corresponding digital signals in the 3-bit combination which corresponds to the running shift position. In addition, the two values, which are different between these 3-bit combinations, are equal to each other.

Thus, when the combination of digital signals produced based on the output values from the magnetic-field detection sensors 220, 222 and 224 is influenced by an external factor-based change in the magnetic field, the control apparatus for the shift-position changing mechanism 48 does not erroneously regard the shift position different from the running shift positions as the running shift position, unless the values indicated by at least two signals change. Accordingly, it is possible to reduce the likelihood that the shift position different from the running shift position will be erroneously regarded as the running shift position.

More preferably, the 3-bit combination of digital signals, which corresponds to a shift position different from the running shift positions, is set in the following manner. The values indicated by at least any two of the digital signals in the 3-bit combination which corresponds to the shift position different from the running shift position are set to be different from the values indicated by the corresponding digital signals in the 3-bit combination which corresponds to the running shift position. In addition, the two values, which are different between these 3-bit combinations, are different from each other.

Thus, when the combination of digital signals produced based on the output values from the magnetic-field detection sensors 220, 222 and 224 is influenced by an external factor-based change in the magnetic field, the control apparatus for the shift-position changing mechanism 48 does not erroneously regard the shift position different from the running shift positions as the running shift position, unless the values indicated by at least two signals change. Also, when the combination of digital signals produced based on the output values from the magnetic-field detection sensors 220, 222 and 224 is influenced by an external factor-based change in the magnetic field, the situation is not caused in which the magnetic field does not change although a change in the magnetic field due to the operation of the shift lever is caused. Also, the situation in which the value of only one of the signals increases while the value of the other signal decreases is unlikely to occur. When the external factor-based change is caused due to the single factor, it is considered that both of the signals change in the same manner. Accordingly, it is possible to further reduce the likelihood that the shift position different from the running shift position will be erroneously regarded as the running shift position, by making the values, different between these combinations, different from each other.

Hereafter, a control apparatus for the shift-position changing mechanism 48 according a second embodiment of the invention will be described. The structure of a vehicle including the control apparatus for the shift-position changing mechanism 48 according to the second embodiment of the invention is the same as that of the vehicle including the control apparatus for the shift-position changing mechanism 48 according to the first embodiment of the invention, except the shape of a shift gate and the shift positions selected by the automatic transmission. The same portions as those in the first embodiment of the invention will be denoted by the same reference numerals. The functions of the portions having the same reference numerals as those in the first embodiment of the invention are also the same. Accordingly, the portions having the same reference numerals will not be described in detail below.

Figures 13, 14:
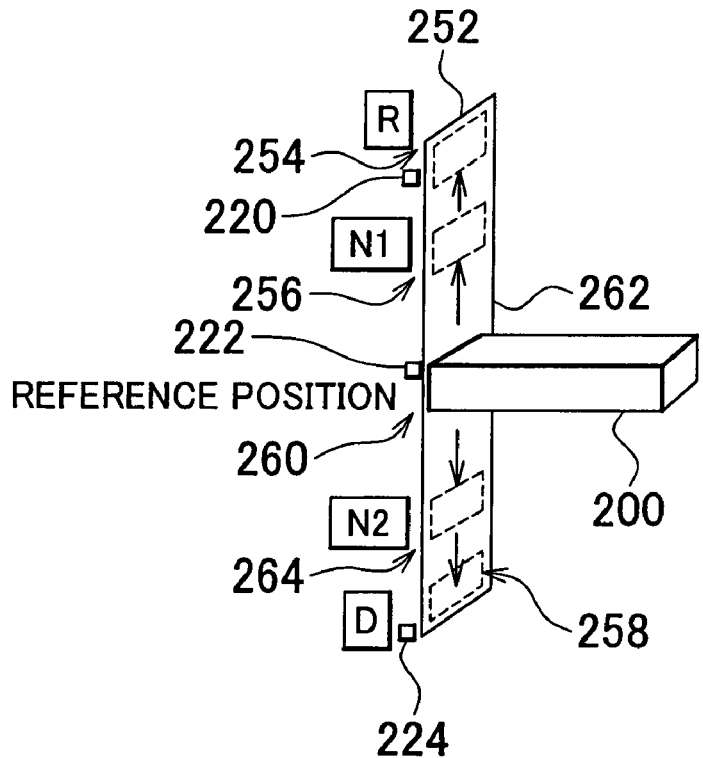
FIG. 13 is a view showing the structure of an operation device according to a second embodiment of the invention.
FIG. 14 is a table showing an example of multiple 3-bit combinations of digital signals, which correspond to the respective shift positions according to the second embodiment of the invention.

The shape of a shift gate 252 and the shift positions according to the second embodiment of the invention will be described below. As shown in FIG. 13, the shift control system 10 includes the shift gate 252 that has an I-shaped passage 262, and the shift lever 200. The shift lever 200 is provided so as to be movable along the path formed in the shift gate 252.

The shift positions are set on the path along which the shift lever 200 moves and which is formed in the shift gate 252. The shift positions are set at the both ends of the passage 262 and a position between the both ends of the passage 262. R is set at an end portion 254 at the upper end of the passage 262, and D is set at an end portion 258 at the lower end of the passage 262, in FIG. 13. The shift position indicating the reference position is set at a position 260 substantially at the center between D and R, in FIG. 13. N1 is set at a position 256 substantially at the center between R and the shift position indicating the reference position. N2 is set at a position 264 substantially at the center between D and the shift position indicating the reference position. N1 and N2 each indicate N.

The shift lever 200 is provided with a momentary mechanism of which reference position is the position 260. Namely, when the driver does not apply an operational force to the shift lever 200, the shift lever 200 is returned to the reference position by an elastic force of an elastic member, for example, a spring.

In the thus configured shift gate 252, the magnetic-field detection sensors 220, 222 and 224 are arranged at predetermined positions, as shown in FIG. 13.

As shown in FIG. 13, the magnetic-field detection sensor 220 is provided in the passage 262 of the shift gate 252, at a position corresponding to the end portion 254. When the shift lever 200 is moved to R, the value indicated by the first signal is changed from "0" to "1" when the distance between the shift lever 200 and the magnetic-field detection sensor 220 becomes equal to or shorter than a predetermined value.

The magnetic-field detection sensor 222 is arranged at the position 260 in the passage 262 of the shift gate 252. When the shift lever 200 is moved to the shift position indicating the reference position, the value indicate by the second signal is changed form "0" to "1" when the distance between the shift lever 200 and the magnetic-field detection sensor 222 becomes equal to or shorter than the predetermined value.

The magnetic-field detection sensor 224 is provided at the position corresponding to the end portion 258 in the passage 262 of the shift gate 252. When the shift lever 200 is moved to the D, the value indicated by the third signal is changed from "0" to "1" when the distance between the shift lever 200 and the magnetic-field detection sensor 224 becomes equal to or shorter than the predetermined value.

The SBW-ECU 40 determines the selected shift position based on the result of comparison between the 3-bit combination of digital signals produced based on the output values from the magnetic-field detection sensors 220, 222 and 224, and the predetermined multiple 3-bit combinations of digital signal, which correspond to the respective shift positions.

As shown in FIG. 14, the combination of the first signal indicating "1", the second signal indicating "0", and the third signal indicating "0" corresponds to R. This combination corresponds to the combination X4 in FIG. 6.

The combination of the first signal indicating "1", the second signal indicating "1", and the third signal indicating "0" corresponds to N1. This combination corresponds to the combination X7 in FIG. 6.

The combination of the first signal indicating "0", the second signal indicating "1" and the third signal indicating "0" corresponds to the shift position indicating the reference position. This combination corresponds to the combination X3 in FIG. 6.

The combination of the first signal indicating "0", the second signal indicating "1" and the third signal indicating "1" corresponds to N2. This combination corresponds to X5 in FIG. 6.

The combination of the first signal indicating "0", second signal indicating "0", and the third signal indicating "1" corresponds to D. This combination corresponds to the combination X2 in FIG. 6.

The detection characteristics and the arrangement of the magnetic-field detection sensors 220, 222 and 224 are set such that the above-described 3-bit combinations of digital signals are output when the shift lever 200 is at the corresponding shift positions.

Setting the predetermined multiple 3-bit combinations of digital signals, which correspond to the respective shift positions enables the SBW-ECU 40 to determine the position of the shift lever 200.

As in the case of the control apparatus for the shift-position changing mechanism 48 according to the first embodiment of the invention, setting the 3-bit combinations of digital signals, which correspond to the respective shift positions, makes it possible to reduce the likelihood that the shift position different from the running shift position will be erroneously regarded as the running shift position when the combination of digital signals produced based on the output values from the magnetic-field detection sensors 220, 222 and 224.

The manner in which the control apparatus for the shift-position changing mechanism 48 determines the selected shift position is the same as that according to the first embodiment of the invention. Therefore, the description concerning the manner will not be provided below.

The control apparatus for the shift-position changing mechanism 48 according to the second embodiment of the invention produces the same effects as those produced by the control apparatus for the shift-position changing mechanism 48 according to the first embodiment of the invention.

The control apparatus according to the invention may be applied to any one of an automatic transmission that executes the gear control in which the gear corresponding to the shift-position selected by the driver is used, and an automatic transmission that executes the shift-range control in which the gear corresponding to the shift-position selected by the driver and the gears lower than the selected gear are all used.

The embodiments of the invention that have been described in the specification are to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for a shift-position changing mechanism that changes shift positions of a transmission using a rotational force of an actuator based on a signal corresponding to a state of an operation member which is provided with a magnetic member, comprising:
    a detection unit that is provided on a path along which the operation member is moved, and that detects a change in a magnetic field which is caused due to a change in a position of the operation member; and
    a determination unit that determines the shift position corresponding to a position, to which the operation member has been operated, based on the detected change in the magnetic field and predetermined multiple modes of changes in the magnetic field, which correspond to the respective shift positions,
    wherein
    the predetermined modes of changes in the magnetic field are set such that, when the detected change in the magnetic field is influenced by a change in the magnetic field, which is caused due to a factor that differs from the change in the position of the operation member, a likelihood that the determination unit determines that the running shift position, at which a vehicle is able to run, is selected is reduced.

2. The control apparatus according to claim 1, wherein the predetermined modes of changes in the magnetic field are set such that, when the detected change in the magnetic field is influenced by the change in the magnetic field, which is caused due to the factor that differs from the change in the position of the operation member, a likelihood that the determination unit will determine that the shift position that differs from the running shift position is selected is increased.

3. The control apparatus according to claim 2, wherein the shift position that differs from the running shift position is Neutral.

4. The control apparatus according to claim 2, wherein the operation member is provided with a mechanism that returns the operation member to a predetermined reference position unless the operation member is maintained at a position reached after the change in the position, and the reference position is the shift position that differs from the running shift position.

5. The control apparatus according to claim 1, wherein the detection unit includes:
    a first magnetic-field detection unit that detects a first change in the magnetic field, which is caused due to a change in a positional relationship between the first magnetic-field detection unit and the operation member;
    a second magnetic-field detection unit that is arranged at a position different from the position at which the first magnetic-field detection unit is arranged, and that detects a second change in the magnetic field, which is caused due to a change in a positional relationship between the second magnetic-field detection unit and the operation member; and
    a third magnetic-field detection unit that is arranged at a position different from the position at which the first magnetic-field detection unit is arranged and the position at which the second magnetic-field detection unit is arranged, and that detects a third change in the magnetic field, which is caused due to a change in a positional relationship between the third magnetic-field detection unit and the operation member,
    wherein
    the predetermined modes of changes in the magnetic field are predetermined combinations of the first change in the magnetic field, the second change in the magnetic field, and the third change in the magnetic field, and the predetermined combinations correspond to the respective shift positions.

6. The control apparatus according to claim 5, wherein the first magnetic-field detection unit includes a unit that outputs a digital signal indicating a position of the first magnetic-field detection unit relative to the operation member, the second magnetic-field detection unit includes a unit that outputs a digital signal indicating a position of the second magnetic-field detection unit relative to the operation member, and the third magnetic-field detection unit includes a unit that outputs a digital signal indicating a position of the third magnetic-field detection unit relative to the operation member, respectively, and
    the predetermined combinations are combinations of digital signals, which correspond to the respective shift positions.

7. The control apparatus according to claim 6, wherein the determination unit includes a unit that determines whether the combination of digital signals is stable, and, when it is determined that the combination of digital signals is stable, the determination unit determines the shift position corresponding to the position to which the operation member has been operated.

8. The control apparatus according to claim 6, wherein the predetermined combination corresponding to the shift position that differs from the running shift position is set such that values of any two of the digital signals differ from values of the corresponding digital signals included in the predetermined combination corresponding to the running shift position.

9. The control apparatus according to claim 8, wherein
the two values, which are indicated by the two signals included in the predetermined combination corresponding to the shift position that differs from the running shift position and which differ from the values of the corresponding digital signals included in the predetermined combination corresponding to the running shift position, are different from each other or equal to each other.

10. The control apparatus according to claim 6, wherein
the predetermined combination corresponding to the shift position that differs from the running shift position is set such that a value of at least one of the digital signals differs from a value of the corresponding digital signal included in the predetermined combination corresponding to the running shift position, and
the value, which is indicated by the digital signal included in the predetermined combination corresponding to the shift position that differs from the running shift position and which differs from the value of the corresponding digital signal included in the predetermined combination corresponding to the running shift position, is a value that is not changed by the change in the magnetic field, which is caused due to the factor that differs from the change in the position of the operation member.

11. The control apparatus according to claim 5, wherein
the first magnetic-field detection unit includes a unit that outputs an analog signal indicating a position of the first magnetic-field detection unit relative to the operation member, the second magnetic-field detection unit includes a unit that outputs an analog signal indicating a position of the second magnetic-field detection unit relative to the operation member, and the third magnetic-field detection unit includes a unit that outputs an analog signal indicating a position of the third magnetic-field detection unit relative to the operation member, respectively,
the control apparatus further includes a unit that converts the analog signals into digital signals, and
the predetermined combinations are combinations of digital signals, which correspond to the respective shift positions.

12. A control method for a shift-position changing mechanism that changes shift positions of a transmission using a rotational force of an actuator based on a signal corresponding to a state of an operation member which is provided with a magnetic member, comprising:
detecting a change in a magnetic field which is caused due to a change in a position of the operation member; and
determining the shift position corresponding to a position, to which the operation member has been operated, based on the detected change in the magnetic field and predetermined multiple modes of changes in the magnetic field, which correspond to the respective shift positions, wherein
the predetermined modes of changes in the magnetic field are set such that, when the detected change in the magnetic field is influenced by a change in the magnetic field, which is caused due to a factor that differs from the change in the position of the operation member, a likelihood that it is determined that the running shift position, at which a vehicle is able to run, is selected is reduced.

13. The control method according to claim 12, wherein
the predetermined modes of changes in the magnetic field are set such that, when the detected change in the magnetic field is influenced by the change in the magnetic field, which is caused due to the factor that differs from the change in the position of the operation member, a likelihood that it will be determined that the shift position that differs from the running shift position is selected is increased.

14. The control method according to claim 12, wherein
changes in the magnetic field are detected at three different positions in order to detect the change in the magnetic field which is caused due to the changes in the positional relationships between the respective three positions and the operation member, and
the predetermined modes of changes in the magnetic field are predetermined combinations of changes in the magnetic field at the three positions, and the combinations correspond to the respective shift positions.

15. The control method according to claim 14, wherein
the changes in the magnetic field detected at the respective three positions are output as digital signals that indicate the positional relationships between the respective three positions and the operation member, and
the predetermined combinations are combinations of digital signals, which correspond to the respective shift positions.

16. The control method according to claim 15, further comprising:
determining whether the combination of digital signals is stable, and,
determining the shift position corresponding to the position to which the operation member has been operated, when it is determined that the combination of digital signals is stable.

17. The control method according to claim 15, wherein
the predetermined combination corresponding to the shift position that differs from the running shift position is set such that values of any two of the digital signals differ from values of the corresponding digital signals included in the predetermined combination corresponding to the running shift position.

18. The control method according to claim 17, wherein
the two values, which are indicated by the two signals included in the predetermined combination corresponding to the shift position that differs from the running shift position and which differ from the values of the corresponding digital signals included in the predetermined combination corresponding to the running shift position, are different from each other or equal to each other.

19. The control method according to claim 15, wherein
the predetermined combination corresponding to the shift position that differs from the running shift position is set such that a value of at least one of the digital signals differs from a value of the corresponding digital signal included in the predetermined combination corresponding to the running shift position, and
the value, which is indicated by the digital signal included in the predetermined combination corresponding to the shift position that differs from the running shift position and which differs from the value of the corresponding digital signal included in the predetermined combination corresponding to the running shift position, is a value that is not changed by the change in the magnetic field, which is caused due to the factor that differs from the change in the position of the operation member.

20. The control method according to claim 14, wherein
the changes in the magnetic field detected at the three respective positions are output as analog signals that indicate the positional relationships between the respective three positions and the operation member,
the analog signals are converted into digital signals, and
the predetermined combinations are combinations of digital signals, which correspond to the respective shift positions.

* * * * *